G. E. WHITE.
AUTOMATIC PIPE VISE.
APPLICATION FILED JAN. 24, 1920.
1,359,775.
Patented Nov. 23, 1920.
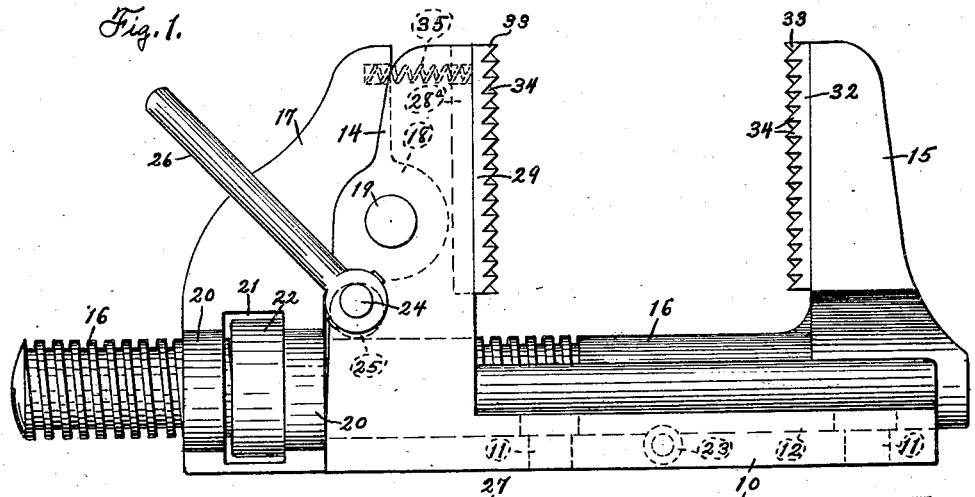
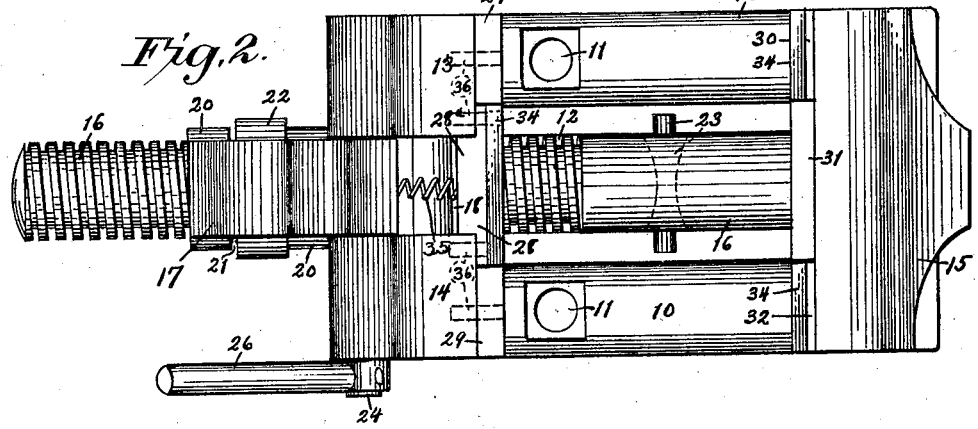
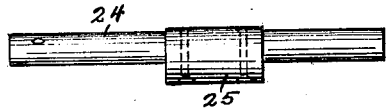
INVENTOR:
G. E. WHITE
By Earl M. Sinclair
Atty.

UNITED STATES PATENT OFFICE.

GILBERT E. WHITE, OF DES MOINES, IOWA.

AUTOMATIC PIPE-VISE.

1,359,775.     Specification of Letters Patent.     Patented Nov. 23, 1920.

Application filed January 24, 1920. Serial No. 353,675.

*To all whom it may concern:*

Be it known that I, GILBERT E. WHITE, a citizen of the United States of America, and resident of Des Moines, Polk county, Iowa, have invented a new and useful Automatic Pipe-Vise, of which the following is a specification.

The object of this invention is to provide an improved construction for a bench vise particularly adapted for gripping pipes, rods and other cylindrical objects.

A further object of this invention is to provide an improved construction for a vise adapted to grip a pipe, rod or other cylindrical object and prevent rotation thereof in either direction.

A further object of this invention is to provide an improved construction for a vise having threaded adjusting means by which it may be adjusted substantially to the size of the object to be gripped and cam devices adapted to further move the jaws through a slight distance to perform the gripping operation; said vise also being provided with spring devices to release the gripped object after said cam devices have been moved to inoperative position.

My invention consists in the construction, arrangement and combination of elements hereinafter set forth, pointed out in my claims and illustrated by the accompanying drawing, in which—

Figure 1 is a side elevation of a vise embodying my invention. Fig. 2 is a plan of the same. Fig. 3 is a detail of the cam shaft detached.

In the construction of the device as shown the numeral 10 designates a suitable base which is formed with a plurality of bolt holes 11 by means of which it may be securely fastened to a bench or other support. The base 10 is formed with a centrally and longitudinally arranged groove or seat 12 in its upper surface, which is preferably substantially semi-circular in cross-section. Integrally formed on and rising from one end portion of the base 10 are two laterally spaced wings 13, 14 of a stationary jaw member, said wings being arranged on opposite sides of the groove 12. A movable jaw member 15 is provided and is mounted slidably on the base 10, and said member is formed with or has fixed to it a stem 16 which is arranged in the groove 12 of the base and extends between and beyond the wings 13, 14 of the fixed jaw member. The stem 16 is circular in cross-section and is threaded throughout the greater portion of its length. A controlling member 17 is mounted on the side of the fixed jaw member opposite to the movable jaw member 15. The controlling member is formed, substantially midway between its upper and lower ends, with a forwardly extending boss 18, through which it is pivotally secured to and between the wings 13, 14 by means of a pin 19. At its lower end the controlling member 17 is formed with a bearing 20 through which the stem 16 of the movable jaw member passes freely, and a recess 21 is formed in said member extending across said bearing. An adjusting nut 22 is threaded on the stem 16 within the recess 21 of the controlling member and is adapted for manipulation selectively in opposite directions of rotation to cause the movable jaw member 15 to be advanced or retracted relative to the fixed jaw member, through the stem 16, said stem and jaw member sliding in the groove 12 of the base 10. A roller 23 may be journaled in the central portion of the groove 12 of the base and be contacted by the stem 16, and said roller preferably is shaped to conform to the curvature of said stem. A shaft 24 is transversely arranged and is journaled for oscillation in rear or outer portions of the jaw wings 13, 14 just above the stem 16 and below the pivot 19. An eccentric or cam 25 is fixed to the central portion of the shaft 24, between the jaw wings 13, 14, and is adapted to bear at times against and exert pressure on the forward or inner face of the controlling member 17, just below the boss 18 thereof and above the bearing 20. The cam shaft 24 is adapted to be actuated by means of a hand lever 26 fixed to one end thereof. The pressure exerted by the cam or eccentric 25 is adapted to move the lower portion of the controlling member 17 slightly away from the fixed jaw wings 13, 14, apply pulling strain on the stem 16, and cause the movable jaw member 15 to be moved slightly toward the stationary jaw members, thus taking up any play or looseness which may exist in the movable parts and tightening the jaws on an object to be gripped. The jaw members are formed with suitable gripping devices which preferably are so arranged as to tend to prevent rotary movement in either direction of an object gripped between them. Separate gripping plates 27, 28, 29 preferably are secured to the front or inner faces of the jaw wings 13, 14; and separate gripping plates 30, 31, 32 are fixed to the inner face of the movable jaw member 15. These gripping plates are secured to the jaw members, removably and replaceably, by means of screws or pins 36 (dotted lines Fig. 2), or in any other common and well known manner; and the gripping plates attached to each of the jaw members are arranged in transverse alinement. Each of the gripping plates is formed with inclined gripping teeth 33 or 34, the inclination of the teeth 33 being opposite to that of the teeth 34. I have here shown the plates 27 and 29 of the fixed jaw member formed with the upwardly inclined teeth 33 and the intermediate plate 28 thereof formed with the downwardly inclined teeth 34; while the outermost plates 30 and 32 of the movable jaw member are formed with the downwardly inclined teeth 34 and the intermediate plate 31 thereof is formed with the upwardly inclined teeth 33. According to this arrangement each of the gripping plates is opposed to a plate having an opposite inclination of its teeth, the gripping effect of such plates therefore being opposite in the opposed pairs and tending to prevent rotation of an object in opposite directions. The effective surfaces of the oppositely inclined gripping plates of each jaw member is substantially the same, the intermediate plates in this instance being substantially twice the width of either of the outside plates so that the gripping effect in each direction of each jaw member is substantially the same. The intermediate gripping plate 28 of the fixed jaw member preferably bridges the space between the wings 13, 14 thereof, and a portion 28$^a$ of said plate may extend rearwardly somewhat between said wings to facilitate the attachment thereto. The combined gripping plates of each jaw member extend the entire width of the device and the side margins of the outermost of said members are flush with the side margins of the jaw members.

In practical use, the cam shaft 24 being turned to inoperative position as shown, the adjusting nut 22 is turned to position the movable jaw member relative to the fixed jaw member, whereby the distance between the teeth of the opposed gripping plates is substantially the same as the diameter of the object to be gripped. Then the hand lever 26 is turned forwardly to cause the cam or eccentric 25 to exert pressure against the forward face of the controlling member 17, applying strain on the stem 16 and moving the jaw member 15 slightly toward the fixed jaw member and causing the gripping plates to apply gripping strain on the object held between the jaw members. On account of the opposite inclination of the teeth of opposed gripping plates this gripping strain is effective to prevent rotation or turning of the gripped object in either direction. On account of the perfected gripping arrangement of the plates, an object will be securely held when only a relatively short portion of its length is actually between the jaw members; and as the gripping plates extend completely to the side margins of the vise, a tool, such as a thread-cutting device, may be operated up to a plane substantially coinciding with the vertical plane of either side of the vise; in other words, a pipe may be threaded up to a point practically coincident with the side margin of the vise.

When it is desired to release the work object the lever 26 is turned oppositely, to the position shown, to release pressure on the controlling member 17 and allow it to resume its normal position. An expansive spring 33 preferably is mounted between the upper end of the controlling member 17 and the fixed jaw member (or the intermediate gripping plate 28 thereof), and acts to release the controlling member after the lever is turned to releasing position.

It is apparent that this vise is simple and inexpensive of construction, and that great advantage lies in the rapid and automatic adjustment provided, which results in a material and considerable saving of time and labor in its use.

I claim as my invention—

1. A vise, comprising a base formed with a groove and with an integral jaw member, a movable jaw member slidably mounted in the groove of said base and formed with a threaded stem projecting through and beyond said fixed jaw member, a controlling member pivoted to the outside of the fixed jaw member, said stem passing freely through said controlling member, an adjusting nut in said controlling member threaded on said stem, and cam devices journaled in said fixed jaw member and adapted to engage and sightly oscillate said controlling member.

2. A vise, comprising a base formed with an integral jaw member, a movable jaw member slidably mounted on said base and formed with a threaded stem projecting through and beyond said fixed jaw member, a controlling member pivoted to the outside of the fixed jaw member, said stem passing freely through said controlling member, an adjusting nut in said controlling member threaded on said stem, a cam shaft journaled in said fixed jaw member and adapted to engage and oscillate said controlling member in one direction, and a yielding pressure device adapted to oscillate said controlling member in the opposite direction.

3. A vise, comprising a base formed with an integral jaw member, a movable jaw member slidably mounted on said base and formed with a threaded stem projecting through and beyond said fixed jaw member, a controlling member pivoted between its ends to said fixed jaw member, said stem passing freely through said controlling member, an adjusting nut in said controlling member threaded on said stem, a yielding pressure device adapted to apply pressure on said controlling member on one side of the pivot thereof, a cam shaft journaled in said fixed jaw member and formed with a cam adapted to apply pressure on said controlling member on the opposite side of the pivot thereof, and a handle for rocking said cam shaft.

4. A vise, comprising a base formed with an integral jaw member, a movable jaw member slidaby mounted on said base and formed with a threaded stem projecting through and beyond the fixed jaw member, a controlling member pivoted between its ends to said fixed jaw member, said stem passing freely through said controlling member, an adjusting nut in said controlling member threaded on said stem, and cam devices journaled in said fixed jaw member and adapted to engage and oscillate said controlling member and thereby oscillate said stem and the movable jaw member relative to the fixed jaw member, each of said jaw members being formed with a plurality of sets of teeth arranged in parallel rows and inclined in opposite directions.

5. A vise, comprising a base formed with an integral jaw member, a movable jaw member slidably mounted on said base and formed with a threaded stem projecting through and beyond the fixed jaw member, a controlling member pivoted between its ends to the fixed jaw member, said stem passing freely through said controlling member, an adjusting nut in said controlling member threaded on said stem, and cam devices journaled in said fixed jaw member and adapted to engage and oscillate said controlling member and thereby oscillate said stem and the movable jaw member relative to the fixed jaw member, each of said jaw members being formed with a plurality of sets of teeth arranged in parallel rows and inclined in opposite directions, the opposed sets of teeth on the respective jaw members also being oppositely inclined.

6. A vise, comprising a base formed near one end with laterally spaced wings of a fixed jaw member, said base also being formed with a longitudinal groove in its upper face, a movable jaw member formed with a threaded stem, said movable jaw member and its stem being slidably mounted in the groove of said base, the stem projecting between and beyond said fixed jaw wings, a controlling member mounted on that side of the fixed jaw member opposite to the movable jaw member and formed with a boss extending between and pivoted to the wings thereof, said stem passing freely through said controlling member, an adjusting nut rotataby mounted in said controlling member and threaded on said stem, and cam devices carried by said fixed jaw member and adapted to engage and oscillate said controlling member and thereby oscillate said stem and the movable jaw member relative to the fixed jaw member.

7. A vise, comprising a base formed with an integral jaw member, a movable jaw member slidably mounted on said base and formed with a threaded stem projecting through and beyond said fixed jaw member, a controlling member pivoted to said fixed jaw member, said stem passing freely through said controlling member, an adjusting nut rotatably mounted in said controlling member and threaded on said stem, and cam devices carried by said fixed jaw member and adapted to engage and oscillate said controlling member and thereby oscillate said stem and the movable jaw member relative to the fixed jaw member, each of said jaw members being provided on its inner face with a removable and replaceable gripping plate formed with upwardly inclined teeth and with a removable and replaceable gripping plate formed with downwardly inclined teeth, the upwardly inclined teeth of one jaw member being opposed to the downwardly inclined teeth of the other jaw member.

Signed at Chickasha, in the county of Grady and State of Oklahoma, this 30th day of December, 1919.

GILBERT E. WHITE.